United States Patent [19]

Pratt

[11] 4,366,646
[45] Jan. 4, 1983

[54] EVAPORATIVE COOLING CHAMBER FOR GROWTH OF PLANTLETS PRODUCED FROM IN VITRO CULTURES

[75] Inventor: Keith W. Pratt, San Mateo, Calif.

[73] Assignee: International Plant Research Institute, San Carlos, Calif.

[21] Appl. No.: 292,393

[22] Filed: Aug. 13, 1981

[51] Int. Cl.³ .............................................. A01G 13/02
[52] U.S. Cl. ........................................ 47/27; 47/17; 47/31
[58] Field of Search .................... 47/26–27, 47/28 R, 29, 31, 17, 20–21, 80–81

[56] References Cited

U.S. PATENT DOCUMENTS 1,254,260  1/1918  Mueller ................................... 47/27
2,807,912  10/1957  Bjorksten ............................. 47/27 X
2,950,567  8/1960  Newman .............................. 47/27 X

FOREIGN PATENT DOCUMENTS 2363981  5/1978  France ................................... 47/27
1152830  5/1969  United Kingdom ................... 47/27

Primary Examiner—Robert E. Bagwill
Attorney, Agent, or Firm—Cooper, Dunham, Clark, Griffin & Moran

[57] ABSTRACT

An evaporative cooling chamber useful for growing plants produced from in vitro cultures includes a floor constructed of cotton matting to permit liquid water to be brought into capillary contact with plant material placed thereon, sidewalls of cheesecloth or saran extending vertically upward, a water delivery system of ooze piping for delivering water along the top edges of the side walls, including a water supply trough for feeding the ooze piping and a translucent roof member adapted to receive water of condensation formed within the chamber and to deliver the condensed water to the water supply trough for recirculation and continuation of the evaporative cooling process.

10 Claims, 7 Drawing Figures

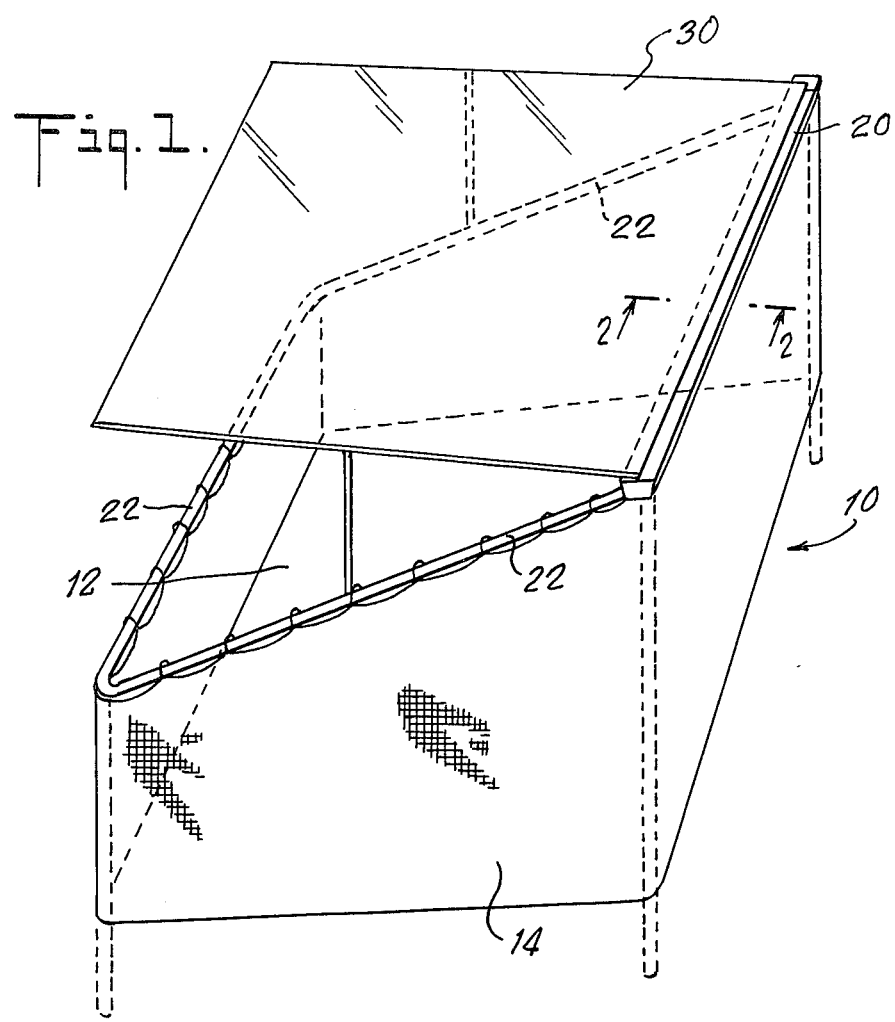
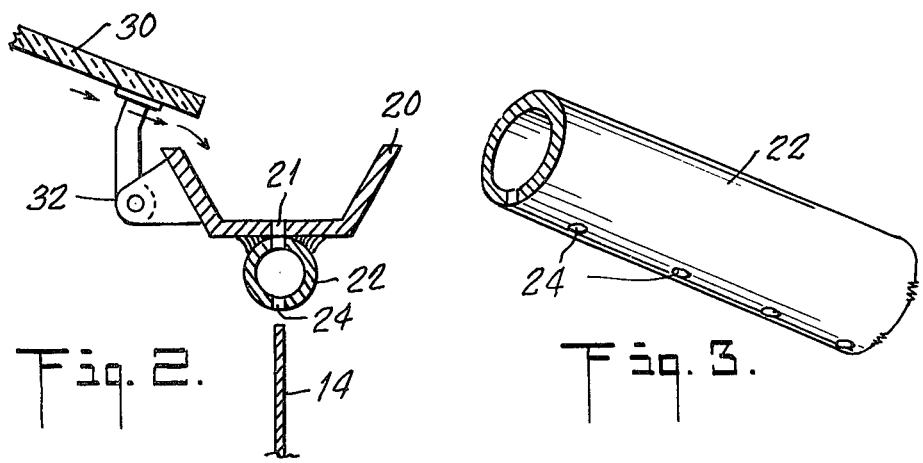

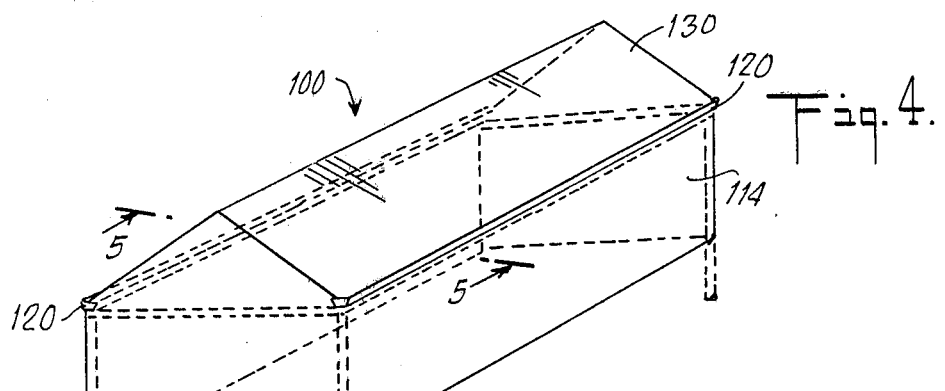
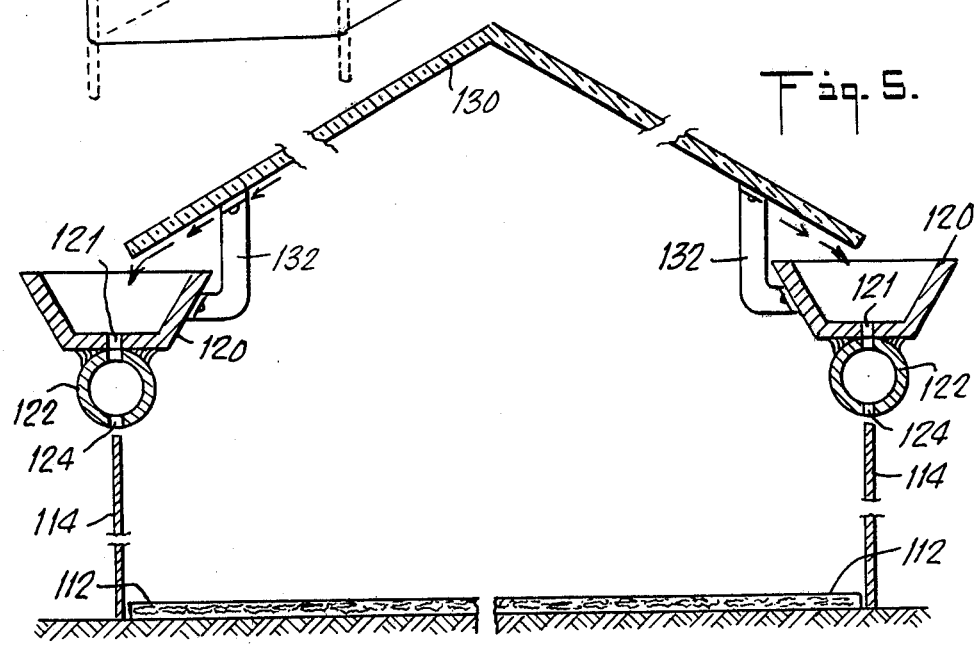
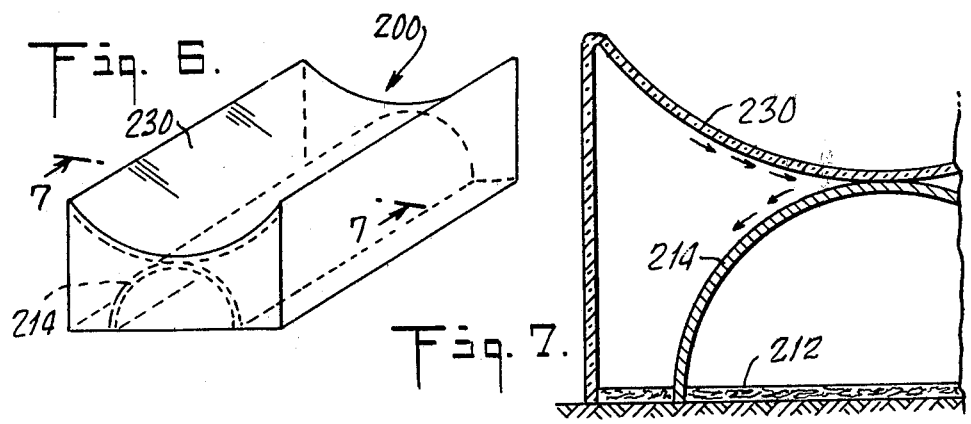

EVAPORATIVE COOLING CHAMBER FOR GROWTH OF PLANTLETS PRODUCED FROM IN VITRO CULTURES

FIELD OF THE INVENTION

This invention concerns apparatus for acclimating or propagating herbaceous plant material which is subject to desiccation through transpirational water loss.

DESCRIPTION OF THE PRIOR ART

Assorted propagation-type devices are commonly used in horticultural practices. Examples include mist systems, sweat tents, saran structures and the like. These systems enable plants to retain turgor pressure although their roots may be severed or there may exist a deficit in water uptake due to uncoordinated stomatal action or poor epicuticle development or both. However, none of these systems is entirely satisfactory for propagating or acclimating various in vitro genera.

Techniques for obtaining plant material from cultures are of increasing importance and hold great promise for future applications of genetic engineering approaches in the development of novel plants and the production of useful chemicals of plant origin. However, a significant percentage of plant material does not survive the initial shock of going from in vitro culture into the greenhouse. In order to increase the percentage of surviving plant material, this invention provides a novel evaporative cooling chamber. This apparatus provides a means for creating and maintaining an environment characterized by reduced light intensity, high relative humidity, adequate soil moisture supply and ability to maintain temperatures below extreme detrimental to plant integrity while providing a minimum night temperature of 60°-70° F. The devices of this invention are also relatively low cost and maintenance-free.

SUMMARY OF THE INVENTION

An evaporative cooling chamber useful for growing plants comprises a floor constructed of a suitable material permitting liquid water to be brought into capillary contact with plant material placed thereon; side walls extending upwardly from the floor and constructed of a suitable porous material permitting water retention for a substantial period of time; a water delivery means, including conduit means disposed along substantially the entire length of the upper edges of the side walls and provided with openings for delivering water to the upper edges of the side walls and water supply means for introducing water to the conduit means; and a translucent roof member attached to at least one side wall and adapted to receive water of condensation formed within the chamber and to deliver the condensed water to the water supply means.

In a preferred embodiment, the evaporative cooling chamber has a floor of cotton matting, side walls of cheesecloth or saran, a water delivery system of ooze tubing gravitationally fed with water from a trough and plastic or fiberglass roof.

BRIEF DESCRIPTION OF THE DRAWINGS

FIG. 1 is a perspective view of one embodiment of the evaporative cooling chamber of the present invention.

FIG. 2 is a cross-sectional view taken along the line 2—2 of FIG. 1.

FIG. 3 is a perspective view of a portion of the hollow tubing which may be employed for water delivery.

FIG. 4 is a perspective view of another embodiment of the evaporative cooling chamber of this invention.

FIG. 5 is a cross-sectional view taken along the line 5—5 of FIG. 4.

FIG. 6 is a perspective view of yet another embodiment of the evaporative cooling chamber of this invention.

FIG. 7 is a partial sectional view taken along the line 7—7 of FIG. 6.

DETAILED DESCRIPTION OF THE INVENTION

This invention relates to an apparatus for air-conditioning a greenhouse or other environment through an evaporative cooling process. This apparatus is useful for acclimating or propagating herbaceous plant material and for preventing, through evaporative cooling, the desiccation of in vitro material or soft herbaceous propagules subject to transpirational water loss.

Due to the nature of the water molecule, its rate of evaporative cooling in heat removed is 10.49 Kcal./mole or, expressed differently, 582 calorie/gram at 25° C. An understanding of this fact enables one to determine the points where the evaporation/condensation process commences and terminates and the temperature range which can be anticipated throughout the process. Since the water molecule is capable of removing 10.49 Kcal./mole, the relative environmental cooling is able to maintain the temperature in the chamber within a range ±10°-20° F., depending upon the temperature of the outside environment. Since the system is not initiated until the outside air temperature reaches about 70° F. and maximum evaporative cooling is realized at temperatures of 100° F. and higher, this system is most useful in the tropical regions of the world.

Embodiments of this invention involve devices useful in greenhouses and devices so constructed that they are useful as greenhouses. The latter type of structure could distill its own water supply for irrigation purposes and cool itself within a ±10°-20° F. range. This type of system, if employed in Saudi Arabia or other arid countries, could negate the need for energy intensive water pumps, cooling systems and the like while simultaneously providing its own water supply. If placed directly on a sand surface, it should be capable of withdrawing from the ground water table sufficient water to cool the system and irrigate plant material. Problems would arise with this system in cold climates where water would not be capable of evaporating to an appreciable degree. Of course, in such climates, the degree of light intensity is such that herbaceous material is not under as great an accumulated stress as is found in the warmer climates located in the earth's equatorial zone.

One embodiment of the invention is shown in FIG. 1. Evaporative cooling chamber 10 includes a floor 12 constructed of a suitable capillary mat material, such as cotton matting, which permits liquid water to be brought into capillary contact with plant material, particularly plantlets produced from in vitro cultures, for irrigation purposes. It also provides a surface for efficient water evaporation.

Extending upwardly from the floor there are positioned side walls 14. In the embodiment shown there are four planar side walls, each extending upwardly in a substantially vertical direction. These side walls are constructed of a suitable material which is capable of retaining water for a substantial period of time, while retaining its structural integrity and shedding water to the receiving area and floor of the chamber. Preferably, the side walls are constructed of a porous, light reducing material such as cheesecloth or saran, hung on a frame constructed of a suitable material such as wood, plastic or metal. Although materials providing various percentages of light reduction may be employed for the side walls, those providing up to about 30 percent light reduction are preferred, e.g. 6 percent or 20 percent light reduction.

A water delivery means is disposed along substantially the entire length of the upper edges of side walls 14. This water delivery means includes a water supply 20 such as a reservoir trough. As best seen in FIG. 2, water in trough 20 passes through one or a series of fluid communication openings 21 into conduit means 22 which is disposed along substantially the entire length of the upper edges of the side walls. Conduit means 22, in turn, is provided with openings 24 for delivering water into contact with the upper edges of side walls 14. The water then drips down the side walls to the capillary floor where it is collected. In operation, the side walls of the chamber become the evaporative surfaces from which water evaporates. In this way, the environment is initially cooled. Water which does not evaporate from the side walls is collected on the floor of the device by means of a capillary mat or floor which permits water distribution and provides a suitable surface for additional evaporation.

The cooling chamber illustrated in FIG. 1 delivers water from trough 20 to conduit means 22 based upon the action of gravity. Similarly, gravity is employed for water circulation through conduit means 22 along the upper edges of the side walls. Of course, it will be readily understood that other means, including pumps, solar devices and the like, can be employed for this purpose.

Both trough 20 and conduit means 22 may be constructed of any of numerous materials conventionally used for this purpose, including wood, metal and plastic. One advantage of the present invention is that it can be constructed from native materials such as bamboo, woven reeds or redwood, Alternatively, it can be constructed of plastic, e.g. polyvinylchloride (PVC). The conduit pipes 22 which carry the water can be made of PVC, preferably with cheesecloth or saran placed inside the pipes to facilitate even distribution of water throughout the chamber, or can be constructed of ooze tubing, which is typically black-colored polyethylene perforated with stitching, to allow water drippage and subsequent contact with the side walls. Of course, any material or design can be employed which provides relatively even distribution of water through the system and sufficient drippage to keep the side walls moist.

Finally, chamber 10 is provided with a translucent roof member 30 attached to at least one side wall and adapted to receive water of condensation formed within the chamber and to deliver the condensed water to water supply trough 20 as shown in FIG. 2. Although roof member 30 may be constructed of any suitable material, plastics and fiberglass are presently preferred.

In the embodiment shown, roof 30 is attached to trough 20 by means of hinge member 32 which permits the roof member to be lifted easily for introducing plants into and removing plants from the chamber. Of course, numerous other designs are possible and the embodiment shown in FIG. 1 is not to be understood as limiting in any way the scope of the invention.

A heating pad or cables can be inserted beneath the floor of the system for maintenance of a desired minimum night temperature. The system can be completely covered with plastic or just the top collection panel covered, depending on the temperature which one desires to maintain during the daylight hours.

In operation, the system is started by adding water to collecting trough 20 from whence the water flows downwardly through opening or openings 21 into conduit pipe 22. It then passes through openings 24 onto the upper edges of side walls 14. As the water passes down the side walls, a portion evaporates. The remainder is collected by capillary floor 12. From capillary mat 12, a portion of the water evaporates providing additional cooling. The remainder is employed to irrigate plant material placed on the floor through drainage holes in the bottom of containers for the plants by means of capillary action. The plants may be lowered onto the floor surface at the time one desires to irrigate the plants or the plants may continually remain on the mat surface. Water on the capillary floor eventually evaporates and condenses on the inner surface of plastic roof 30 from whence it is returned to water trough 20 for continuation of the evaporative cooling process by recycling the water. Periodically, e.g. every three days, water lost from the system will need to be replaced.

Thus, the invention provides a self-supportive, low maintenance system which maintains a constant relationship between humidity and temperature for acclimation of in vitro material and propagation of soft herbaceous cuttings which are highly prone to desiccation.

The invention may be adapted to permit plant material to be placed on or removed from the capillary floor by the use of levers. This may be of assistance in avoiding fungal organism attack on the root zone. The entire floor of the chamber may be lifted for leaching and dropped to contact the capillary floor mat and permit plant irrigation.

FIG. 4 shows an alternative embodiment of the invention, in which structure 100 is entirely constructed of polyvinylchloride or a similar material which provides the properties discussed hereinabove. This apparatus may be made available in kit form to plant propagators for use in acclimation systems where it would be advantageous. It could be built on any scale from several feet to several hundred feet.

As shown more clearly in FIG. 5, this embodiment is provided with a sloping roof 130 and two interconnected water collecting means. Each includes a trough 120 to which roof 130 is mounted by attachment means 132. Troughs 120 are provided with openings 121 which permit water to pass into conduit pipes 122. Conduct pipes 122, in turn, are provided with openings 124 from which water drips onto the upper edges of side walls 114 and passes downward to floor 112.

FIG. 6 shows yet another structure 200 in which the system is totally enclosed in plastic in order to conserve water and expedite evaporation. Within the system there is Quonset-shaped structure 214 constructed of saran, cheesecloth or other water shedding-type material which provides an evaporative surface as described hereinabove. This system can be provided with a floor 212 which can be raised or lowered depending on whether irrigation is needed. The water, collected on the convex surface of the upper plate, can drip down to a collection tube at the top of the concave saran structure. Alternatively, the outer convex and inner concave surfaces can contact one another so that water which passes down the former continues its movement along the latter. Water then drips down the sides of the quanset-shaped walls, cooling the inner environment of the chamber. The floor of the structure has a large surface area which provides a substantial evaporative surface.

What is claimed is:

1. An evaporative cooling chamber for growing plants which comprises:
   - a floor constructed of a suitable material permitting liquid water to be brought into capillary contact with plant material placed thereon;
   - side walls extending upwardly from the floor and constructed of a suitable porous material permitting water retention for a substantial period of time;
   - a water delivery means, including conduit means disposed along substantially the entire length of the upper edges of the side walls and provided with openings for delivering water to the upper edges of the side walls and water supply means for introducing water to the conduit means; and
   - a translucent roof member attached to at least one side wall and adapted to receive water of condensation formed within the chamber and to deliver the condensed water to the water supply means.

2. An evaporative cooling chamber in accordance with claim 1 wherein the floor is constructed of cotton matting.

3. An evaporative cooling chamber in accordance with claim 1 wherein the side walls are constructed of cheesecloth hung on a suitable frame.

4. An evaporative cooling chamber in accordance with claims 3 or 4 wherein the frame is constructed of wood, metal or plastic.

5. An evaporative cooling chamber in accordance with claim 1 wherein the side walls are constructed of saran hung on a suitable frame.

6. An evaporative cooling chamber in accordance with claim 1 wherein the side walls are planar and extend upwardly in a substantially vertical direction.

7. An evaporative cooling chamber in accordance with claim 1 wherein the side walls meet to form a concave semicylindrical enclosure.

8. An evaporative cooling chamber in accordance with claim 1 wherein the water supply means comprises a trough extending along at least one side wall and the water delivery means comprises hollow tubing provided with a series of openings spaced along its length, the lower surface of the trough being in fluid communication with the upper surface of the tubing so that water can freely pass from the trough into the tubing and from the tubing onto the tops of the side walls.

9. An evaporative cooling chamber in accordance with claim 1 wherein the roof is constructed of polyethylene.

10. An evaporative cooling chamber for growing plants which comprises:
    - a floor constructed of cotton matting to permit liquid water to be brought into capillary contact with plant material placed thereon;
    - side walls extending upwardly from the floor, said side walls being constructed of cheesecloth or saran hung on a suitable frame and permitting water retention for a substantial period of time;
    - a water delivery means including hollow plastic tubing provided with a series of openings along its length and disposed to deliver water along substantially the entire upper edges of the side walls, including a water supply means for introducing water to the hollow tubing, the lower surface of the trough being in fluid communication with the upper surface of the tubing; and
    - a translucent roof member attached to at least one side wall and adapted to receive water of condensation formed within the chamber and to deliver the condensed water to the water supply means.

* * * * *

UNITED STATES PATENT AND TRADEMARK OFFICE
CERTIFICATE OF CORRECTION

PATENT NO. : 4,366,646
DATED : Jan. 4, 1983
INVENTOR(S) : Keith W. Pratt

It is certified that error appears in the above–identified patent and that said Letters Patent are hereby corrected as shown below:

Col. 5, claim "4" should be --5--.

Col. 5, claim "5" should be --4--.

Signed and Sealed this

Seventeenth Day of July 1984

[SEAL]

Attest:

GERALD J. MOSSINGHOFF

Attesting Officer

Commissioner of Patents and Trademarks